United States Patent
Oh

(10) Patent No.: US 10,469,494 B2
(45) Date of Patent: Nov. 5, 2019

(54) HOME NETWORK SYSTEM USING Z-WAVE NETWORK AND HOME AUTOMATION DEVICE CONNECTION METHOD USING SAME

(71) Applicant: KYUNG DONG ONE CORPORATION, Seoul (KR)

(72) Inventor: Se Young Oh, Seoul (KR)

(73) Assignee: KYUNG DONG ONE CORPORATION, Seoul (KR)

( * ) Notice: Subject to any disclaimer, the term of this patent is extended or adjusted under 35 U.S.C. 154(b) by 201 days.

(21) Appl. No.: 15/534,799

(22) PCT Filed: Dec. 11, 2015

(86) PCT No.: PCT/KR2015/013633
§ 371 (c)(1),
(2) Date: Jun. 9, 2017

(87) PCT Pub. No.: WO2016/093674
PCT Pub. Date: Jun. 16, 2016

(65) Prior Publication Data
US 2018/0159853 A1  Jun. 7, 2018

(30) Foreign Application Priority Data

Dec. 12, 2014  (KR) .................. 10-2014-0179635

(51) Int. Cl.
*H04L 29/06* (2006.01)
*H04L 12/12* (2006.01)
*H04L 12/28* (2006.01)
*H04L 29/08* (2006.01)
*H04W 12/06* (2009.01)
*H04W 4/33* (2018.01)
*H04L 9/32* (2006.01)

(52) U.S. Cl.
CPC ........ *H04L 63/0876* (2013.01); *H04L 9/3231* (2013.01); *H04L 12/12* (2013.01);
(Continued)

(58) Field of Classification Search
CPC ... H04L 63/0876; H04L 9/3231; H04L 12/12; H04L 12/2816; H04L 12/2818;
(Continued)

(56) References Cited

U.S. PATENT DOCUMENTS 10,079,839 B1 * 9/2018 Bryan ............... G06F 3/041
2005/0096753 A1 5/2005 Arling et al.
(Continued)

FOREIGN PATENT DOCUMENTS

KR 10-2009-0100139 A 9/2009
KR 10-2014-0079328 A 6/2014

*Primary Examiner* — Meng Li
*Assistant Examiner* — Alexander R Lapian
(74) *Attorney, Agent, or Firm* — Novick, Kim & Lee, PLLC; Jae Youn Kim

(57) ABSTRACT

A home network system using a Z-Wave network includes a wired/wireless Z-Wave bridge having a Z-Wave communication unit to which a plurality of home automation devices are accessed through the Z-Wave network and an Ethernet communication unit which is accessed to a main server through the Internet, and a main server providing an application for a remote control of the home automation device, and performing MAC authentication to allow access to the wired/wireless Z-Wave bridge upon request by the portable terminal, in which the MAC authenticated portable terminal of the wired/wireless Z-Wave bridge is accessed to the home automation devices to perform remote control.

8 Claims, 3 Drawing Sheets

(52) U.S. Cl.
CPC ...... *H04L 12/2816* (2013.01); *H04L 12/2818* (2013.01); *H04L 12/2834* (2013.01); *H04L 67/125* (2013.01); *H04W 4/33* (2018.02); *H04W 12/06* (2013.01); *G05B 2219/2642* (2013.01)

(58) Field of Classification Search
CPC .... H04L 12/2834; H04L 67/125; H04W 4/33; H04W 12/06; G05B 2219/2642
See application file for complete search history.

(56) References Cited

U.S. PATENT DOCUMENTS

| | | | |
|---|---|---|---|
| 2006/0179300 A1* | 8/2006 | Kearney, III | H04W 92/02 713/162 |
| 2009/0209273 A1* | 8/2009 | Ha | H04W 68/025 455/458 |
| 2009/0217063 A1* | 8/2009 | Tomita | G06F 1/3203 713/310 |
| 2012/0086563 A1 | 4/2012 | Arling et al. | |
| 2012/0163393 A1* | 6/2012 | Dangy-Caye | H04L 12/12 370/401 |
| 2013/0003748 A1* | 1/2013 | Enoki | H04L 47/827 370/401 |
| 2013/0031606 A1* | 1/2013 | Wei | G06Q 50/01 726/3 |
| 2013/0046412 A1 | 2/2013 | Chan et al. | |
| 2013/0205156 A1* | 8/2013 | Niitsuma | G06F 1/3287 713/324 |
| 2014/0167931 A1* | 6/2014 | Lee | H04L 12/2818 340/12.5 |
| 2015/0333965 A1* | 11/2015 | Lee | H04L 45/02 370/254 |

* cited by examiner

US 10,469,494 B2

HOME NETWORK SYSTEM USING Z-WAVE NETWORK AND HOME AUTOMATION DEVICE CONNECTION METHOD USING SAME

TECHNICAL FIELD

The present invention relates to a home network system, and more particularly, to a home network system using a Z-Wave network and a home automation device connection method using the same, in which a home automation device is connected to a Z-Wave network system to thereby enable a stable and wide-range remote control by an external portable terminal, and an easy connection method by MAC authentication of a bridge connecting between the home automation device and the portable terminal is used to thereby secure user convenience.

BACKGROUND ART

Z-Wave is a wireless communications protocol with interoperability that is developed by Zensys which is a Danish company and Z-Wave Alliance, is designed for an apparatus requiring low power and low bandwidth such as home automation device, a sensor network, or the like, and uses a bandwidth with a transmission speed of 9,600 bit/s or 40 Kbit/s and a Gaussian frequency-shift keying (GFSK) modulation scheme.

Further, since it is possible to perform communication outdoors up to about 100 feet, and configure maximum 232 units and networks, a frequency bandwidth of 900 MHz on average is allocated and used globally, and in Korea, it is provided that frequency bandwidths of 919.6 MHz, 921.6 MHz, and 923.1 MHz are used to control a home automation device.

Such a Z-Wave is an RF technology that is most widely used to control the home automation (HA) device currently, and low power consumption, 2-way RF, mesh networking technology, and battery-to-battery support are suitable for controlling sensors and devices. In particular, unlike Zigbee, Z-Wave is interoperated with products of different vendors at an application level, and is cheaper. Due to the advantages described above, currently, 100 or more products of different vendors that may be directly purchased by a consumer have been released in the market.

According to the related art, in most apparatuses, in order to control the home automation device by a portable terminal and the Internet, a network system is configured by a wired/wireless LAN communication scheme. In particular, the wireless LAN does not have a routing function, and has low obstacle transmittance, thus it is difficult to wirelessly control the device in a house with a large area and many obstacles, a lot of information is required to be input at the time of connection, and a connection procedure is complicated, such that it is difficult for an ordinary person to use the device.

Zigbee using 2.4 Ghz frequency band has a similar function to that of Z-Wave. However, since protocol schemes for controlling a smart device of manufacturers are different from each other, it may be difficult to implement interworking, and since most wireless communication frequencies using the wireless LAN use 2.4 GHz frequency band, data loss caused by frequency collision may not be avoided.

Meanwhile, Z-Wave uses a protocol based on IEEE 802.15.4 which is one of standard technologies for low rate wireless personal area networks (LR-WPANs) to facilitate interworking between home automation devices, and has a routing function to configure a network while bypassing an obstacle, thereby securing a longer transmission distance as compared to a transmission distance of a single network.

Accordingly, there is a need to construct a system capable of controlling a home automation device in a more stable and wider-range communication environment by a portable terminal from the outside by embedding a Z-Wave communication protocol in a set-top box connecting between the home automation device and the portable terminal, and the home automation device.

DISCLOSURE

Technical Problem

An object of the present invention is to provide a home network system using a Z-Wave network, and a home automation device connection method using the same, in which a Z-Wave communication protocol is embedded in a wired/wireless Z-Wave bridge and a home automation device, and an Ethernet communication protocol is embedded in the wired/wireless Z-Wave bridge to enable communication with a portable terminal, such that the home automation device may be connected to the external portable terminal.

The technical objects of the present invention are not limited to the above-mentioned technical objects, and other technical objects that are not mentioned will be clearly understood by those skilled in the art through the following descriptions.

Technical Solution

According to an exemplary embodiment of the present invention, a home network system using a Z-Wave network includes: at least one home automation device connected to the Z-Wave network configuring a wireless network such that the device's state is remotely controlled by a portable terminal or a notification is provided to the portable terminal; a wired/wireless Z-Wave bridge including a Z-Wave communication unit having a Z-Wave standard communication protocol and an Ethernet communication unit for Internet connection, having a unique MAC address, and interconnecting the Z-Wave network and the Internet so that the portable terminal that is given access through authentication of the unique MAC address by a main server remotely controls the home automation device; and the main server connected to the wired/wireless Z-Wave bridge or the portable terminal through the Internet, providing an application for a remote control of the home automation device when requested by the portable terminal, and performing the authentication for giving access to the wired/wireless Z-Wave bridge upon request by the portable terminal.

The wired/wireless Z-Wave bridge may further include a connection button for switching into or turning off a connection mode allowing connection between the home automation device and the main serve, and a connection complete button for allowing the MAC-authenticated portable terminal to be connected to the home automation device.

Each home automation device may further include a connection request button for giving the portable terminal access, and in a state in which the wired/wireless Z-Wave bridge is switched into the connection mode, the home automation device that is in a connectable state and the MAC-authenticated portable terminal may be connected with each other by an input of the connection request button.

The home automation device may further include a main home automation device directly connected to the wired/wireless Z-Wave bridge, and a sub-home automation device connected to the wired/wireless Z-Wave bridge through the main home automation device, and as the main home automation device functions as a router, the sub-home automation devices in a wide area may be communicatably connected with each other.

According to another exemplary embodiment of the present invention, a home automation device connection method using a home network system including at least one home automation device connected to a Z-Wave network, a main server connecting a portable terminal to the home automation device, and a wired/wireless Z-Wave bridge, the home automation device connection method includes: (a) performing, by the main server, authentication for giving the portable terminal access by using a unique MAC address of the wired/wireless Z-Wave bridge if the portable terminal requests the authentication for connection to the home automation device by using the unique MAC address; and (b) transmitting, by the main server, a remote control signal for the home automation device that is received from an application of the portable terminal that is given access as a result of the authentication, to the wired/wireless Z-Wave bridge, or receiving a notification indicating a state of the home automation device transmitted through the wired/wireless Z-Wave bridge and providing the notification to the portable terminal.

The (a) performing may further include determining, by the main server, whether the authentication is completed by using a unique MAC address of the wired/wireless Z-Wave bridge that is pre-stored when the portable terminal requests the authentication; switching, by the main server, into a standby state for receiving a unique MAC address of the wired/wireless Z-Wave bridge when a unique MAC address of the wired/wireless Z-Wave bridge that is pre-stored is not present; and storing, by the main server, a unique MAC address of the wired/wireless Z-Wave bridge that connection thereto is requested when the unique MAC address is received, to allow the authentication without switching into the standby state when the portable terminal is connected later.

The (a) performing may further include detecting, by the wired/wireless Z-Wave bridge including a connection button for giving the portable terminal access, an operation of the connection button to be switched into a connection mode, and determining whether the portable terminal requests connection for remotely controlling the home automation device; and detecting, by the main server, an operation of a connection complete button of the wired/wireless Z-Wave bridge when the authentication of the portable terminal is completed to give the portable terminal access to the home automation device.

The (a) performing may further include detecting, by the home automation device connected to the Z-Wave network including a connection request button for connection, an operation of the connection request button to be switched into a connectable state, and giving the portable terminal access in the connectable state.

According to another exemplary embodiment of the present invention, a home network system using a Z-Wave network includes: a wired/wireless Z-Wave bridge including a Z-Wave communication unit having a Z-Wave standard communication protocol and an Ethernet communication unit for Internet connection, having a unique MAC address, and interconnecting the Z-Wave network and the Internet so that a portable terminal that is given access through authentication of the unique MAC address by a main server remotely controls at least one home automation device on the Z-Wave network; and the main server connected to the wired/wireless Z-Wave bridge or the portable terminal through the Internet, and performing the authentication by receiving the unique MAC address for giving access to the wired/wireless Z-Wave bridge from the portable terminal, in which the main server determines whether the authentication is completed by using the unique MAC address of the wired/wireless Z-Wave bridge that is pre-stored when the portable terminal requests the authentication, and is switched into a standby state for receiving a unique MAC address of the wired/wireless Z-Wave bridge when the unique MAC address of the wired/wireless Z-Wave bridge that is pre-stored is not present.

Advantageous Effects

In the home network system using a Z-Wave network according to the present invention, and the home automation device connection method using the same, by configuring the Z-Wave network system, a more stable and wider network may be configured to control the home automation device by the portable terminal from the outside, thereby improving the quality of life of a user.

Further, since the connection method is also performed by simply inputting a unique MAC address of the wired/wireless Z-Wave bridge, anyone can easily control the home automation device by the portable terminal.

Further, the standard communication protocol based on Z-Wave is applied at the time of connection, thus any home automation device in which Z-Wave is embedded may be easily used without limitation in manufacturers as long as it is a home automation device using the wired/wireless Z-wave bridge.

Further, when configuring a wireless network so that the Z-Wave network may interconnect and control a plurality of home automation devices, if the home automation devices are configured to be divided into the main home automation device and a sub-home automation device connected to the main home automation device, the main home automation device may function as a router, such that the home automation devices in a wide area may be communicatably connected with each other, thereby increasing a use range of devices that may communicate with each other.

BEST MODE

Hereinafter, preferred embodiments of the present invention will be described in detail with reference to the accompanying drawings. The terms and words used in the present specification and claims should not be interpreted as being limited to typical meanings or dictionary definitions, but should be interpreted as having meanings and concepts relevant to the technical scope of the present invention based on the rule that an inventor can appropriately define the concept of the term to describe the present invention in the best way.

Therefore, the configurations described in the embodiments and drawings of the present invention are merely most preferable embodiments but do not represent all of the technical spirit of the present invention. Thus it should be understood that there may exist various equivalents and modifications for substituting those at the time of filing this application.

Hereinafter, a home network system using a Z-Wave network according to an exemplary embodiment of the present invention and a home automation device connection method using the same will be described in detail with reference to FIGS. 1 to 3.

Figure 1:
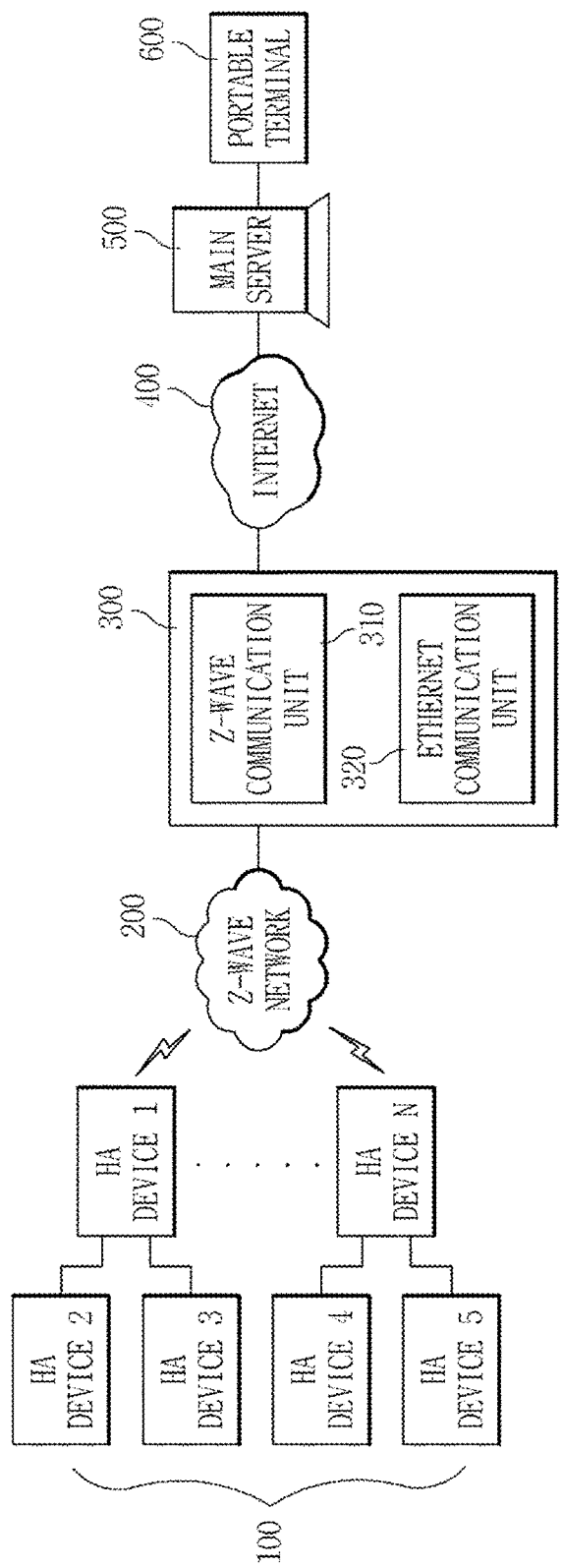
FIG. 1 is a diagram showing an overall configuration of a home network system using a Z-Wave network according to an exemplary embodiment of the present invention.
Figure 2:
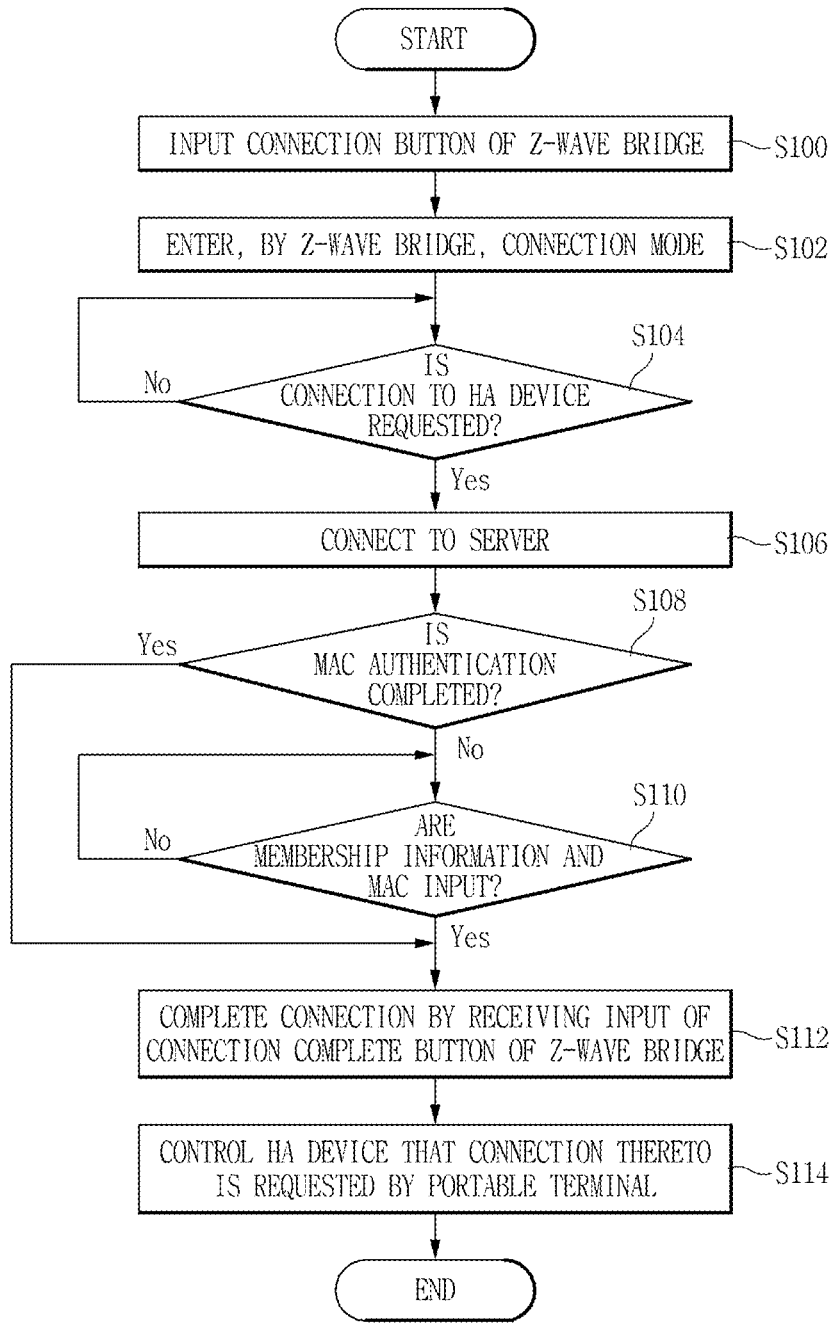
FIG. 2 is a flowchart of a home automation device connection method using the home network system according to the exemplary embodiment of the present invention.

FIG. 1 is a diagram showing an overall configuration of a home network system using a Z-Wave network according to an exemplary embodiment of the present invention.

A home network system using a Z-Wave network 200 according to the present invention includes a plurality of home automation devices 100, the Z-Wave network 200, a wired/wireless Z-Wave bridge 300, the Internet 400, a main server 500, and a portable terminal 600.

The plurality of home automation devices 100 are interconnected with each other in the Z-wave network 200, and are configured to receive a request from a device connected to the home automation device 100 by authentication so that a control of a state of various devices may be performed or a notification may be provided to the device that requested.

Figure 3:
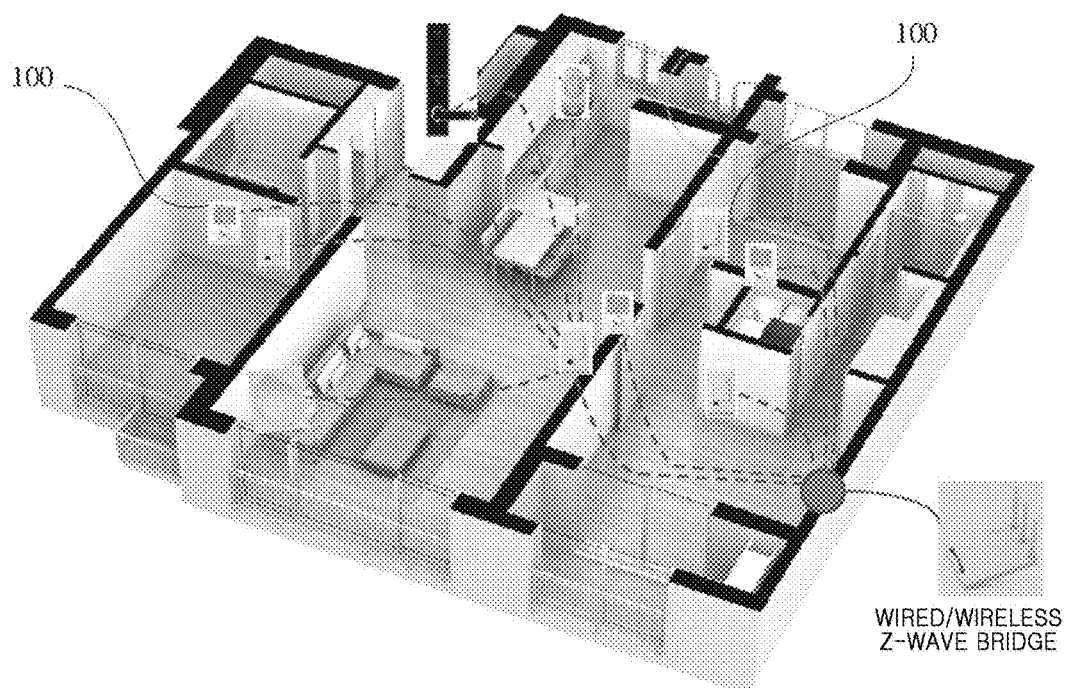
FIG. 3 is a diagram showing an example of a configuration of the home network system of FIG. 1.

The home automation device 100 may be, for example, a boiler, a temperature controller for each room, a lighting, a doorlock, a lobby door, an elevator, a kitchen appliance, and the like as illustrated in FIG. 3.

An indoor temperature, on/off of the lighting, locking/unlocking of the doorlock, calling of the elevator, and on/off of the kitchen appliance, and the like that correspond to state information of the home automation device 100 described above may be controlled, or a state of the corresponding device may be displayed on the device that requested as a notification message form.

Further, the home automation device 100 may be divided into a main home automation device 100 and a sub-home automation device 100.

The main home automation device 100 is supplied with power and is connected to the sub-home automation device 100.

The sub-home automation device 100 is supplied with battery power and is connected to the main home automation device 100 through the wired/wireless Z-Wave bridge 300.

Here, the main home automation device 100 may perform routing, thereby allowing the sub-home automation devices 100 in a wide area to configure the Z-Wave network 200 by an indirect connection through the wired/wireless Z-Wave bridge 300.

Further, each home automation device 100 may further include a connection request button for giving the portable terminal access, thereby restricting connection of the portable terminal 600.

That is, input of the connection request button is detected in a state in which the wired/wireless Z-Wave bridge 300 enters a connection mode, to allow the home automation device 100 that is in a connectable state and the MAC-authenticated portable terminal 600 to be interconnected with each other.

The Z-Wave network 200 configures a wireless network that uses a frequency band of 900 MHz or so to interconnect and control the plurality of home automation devices.

In particular, as the main home automation device 100 functions as a router, the sub-home automation devices 100 in a wide area may be communicatably connected with each other, thereby increasing a use range of devices.

The wired/wireless Z-Wave bridge 300 is an apparatus for interconnecting the Z-Wave network 200 environment to which the plurality of home automation devices 100 are connected and the Internet 400 environment.

The wired/wireless Z-Wave bridge 300 further includes a Z-Wave communication unit 310 having a Z-Wave standard communication protocol and an Ethernet communication unit 320 for connection of the Internet 400 environment.

Further, the wired/wireless Z-Wave bridge 300 may further include a connection button for switching into or turning off the connection mode allowing connection between the home automation device 100 and the main server 500, and a connection complete button for giving the MAC-authenticated portable terminal 600 access to the home automation device 100.

The Internet 400 corresponds to a communication network based on a wired/wireless local area network (LAN).

In particular, the Internet 400 provides a communication network through which the wired/wireless Z-Wave bridge 300 may be connected to the main server 500, and the portable terminal may be connected to the main server 500.

The main server 500 is connected to the wired/wireless Z-Wave bridge 300 and the portable terminal 600.

In particular, the main server 500 may store an application installation program for a remote control of the home automation device 100, and provide the application installation program to the portable terminal 600 that requested.

Further, the main server 500 may perform authentication for giving the portable terminal 600 access to the wired/wireless Z-Wave bridge 300 through the application executed.

The main server 500 needs to store a unique MAC address of the wired/wireless Z-Wave bridge 300 in advance for authentication of the portable terminal 600.

The portable terminal 600 is a terminal that may be connected to the main server 500 through the Internet 400, such as, for example, a smartphone, a phablet phone, a tablet PC, a notebook computer, etc.

The portable terminal 600 may execute the application for controlling the home automation device 100 that is provided from the main server 500, and may also request giving access by inputting the unique MAC address of the wired/wireless Z-Wave bridge 300, as an authentication process for controlling the home automation device 100.

Hereinafter, a method for connecting the home automation device 100 to the wired/wireless Z-Wave bridge 300 and the portable terminal 600 by using the home network system according to the present invention will be described with reference to FIG. 2.

First, a request for connection between the home automation device 100 and the portable terminal 600 may be made by receiving an input of the connection button of the wired/wireless Z-Wave bridge 300 by a user (S100).

Further, the wired/wireless Z-Wave bridge 300 may be switched into the connection mode by receiving the input of the connection button (S102).

Further, the home automation device 100 connected to the Z-Wave network 200 may also include the connection request button for connection.

A remote control by the portable terminal 600 is allowed restrictively for the home automation device 100 in which the connection request button is input by the user (S104).

Meanwhile, the wired/wireless Z-Wave bridge 300 in the connection mode periodically communicates with the portable terminal through the Internet 400 to determine whether there is a connection request for a remote control of the home automation device 100.

When it is determined that there is a connection request by the portable terminal 600, the wired/wireless Z-Wave bridge 300 is connected to the main server 500 on the Internet 400 in order to be connected to the home automation device 100 the portable terminal 600 requested to be connected with (S106)

Further the portable terminal 600 executes the application provided from the main server 500 for a remote control of the home automation device 100.

Then, the portable terminal 600 may request authentication for connection with the home automation device 100 through the wired/wireless Z-Wave bridge by using the executed application.

At this time, the authentication process may be performed by receiving a unique MAC address of the wired/wireless Z-Wave bridge 300 by the portable terminal 600.

Further, the main server 500 needs to store the unique MAC address of the wired/wireless Z-Wave bridge 300 in advance for authentication of the portable terminal 600.

When the authentication is requested by the portable terminal 600, whether the unique MAC address of the wired/wireless Z-Wave bridge 300 that is stored in advance is present is determined.

If the unique MAC address that is stored in advance is present, the authentication may be completed without separately inputting the MAC address by the portable terminal 600 (S108).

If the unique MAC address of the wired/wireless Z-Wave bridge 300 that is stored in advance is not present, the main server 500 may be switched into a standby state to be provided with the unique MAC address of the wired/wireless Z-Wave bridge 300, as a membership registration process (S110).

The wired/wireless Z-Wave bridge 300 may receive the unique MAC address from the portable terminal 600 that requested connection after the main server 500 is switched into the standby state, and the input information is transmitted to the main server 500 to be stored and managed for the authentication without switching into the standby state at the time of connection later.

The main server 500 performs the authentication for giving the portable terminal 600 access by using the unique MAC address of the wired/wireless Z-Wave bridge 300 that is provided from the portable terminal 600.

After the authentication of the main server 500 for the portable terminal 600 is completed, the wired/wireless Z-Wave bridge 300 may give the portable terminal 600 access thereto (S112).

Further, the portable terminal 600 that is given access may receive a connection allowance notification through the executed application.

The portable terminal 600 that receives the connection allowance notification may select a home automation device 100 of which connection is activated by the input of the connection request button among the home automation devices 100 connected to the Z-Wave network 200, thereby performing the remote control.

Further, the portable terminal 600 may also be provided with notification data indicating a current indoor temperature, an on/off state of the home automation device 100, and the like upon request to the home automation device 100.

DETAILED DESCRIPTION OF MAIN ELEMENTS

100; Home automation device
200; Z-Wave network
300; Wired/wireless Z-Wave bridge
310; Z-Wave communication unit
320; Ethernet communication unit
400; Internet
500; Main server
600; Portable terminal

INDUSTRIAL APPLICABILITY

The present invention may be used in a field of home network system using a Z-Wave network, in which a home automation device is connected to a Z-Wave network system to thereby enable a stable and wide-range remote control by an external portable terminal, and an easy connection method by MAC authentication of a bridge connecting between the home automation device and the portable terminal is used to thereby secure user convenience.

The invention claimed is:

1. A home network system using a Z-Wave network, comprising:
  at least one home automation device connected to the Z-Wave network configuring a wireless network, wherein a state of the at least one home automation device is remotely controlled by a portable terminal or a notification is provided to the portable terminal; and
  a wired/wireless Z-Wave bridge including a Z-Wave communication processor having a Z-Wave standard communication protocol and an Ethernet communication processor for Internet connection, the wired/wireless Z-Wave bridge being configured to have a unique MAC address, and interconnecting the Z-Wave network and the Internet, wherein the portable terminal that is given access through an authentication of the unique MAC address by a main server remotely controls the at least one home automation device,
  wherein the main server is connected to the wired/wireless Z-Wave bridge or the portable terminal through the Internet, provides an application for a remote control of the at least one home automation device when requested by the portable terminal, and performs the authentication for giving access to the wired/wireless Z-Wave bridge upon request by the portable terminal,
  wherein the main server determines whether the authentication is completed by using the unique MAC address of the wired/wireless Z-Wave bridge that is pre-stored when the portable terminal requests the authentication, and is switched into a standby state for receiving the unique MAC address of the wired/wireless Z-Wave bridge when the unique MAC address of the wired/wireless Z-Wave bridge that is pre-stored is not present.

2. The home network system of claim 1, wherein the wired/wireless Z-Wave bridge further includes a connection button for switching into or turning off a connection mode allowing connection between the at least one home automation device and the main server, and a connection complete button for giving the MAC-authenticated portable terminal access to the at least one home automation device.

3. The home network system of claim 2, wherein each of the at least one home automation device includes a connection request button for giving the portable terminal access, and wherein, in a state in which the wired/wireless Z-Wave bridge is switched into the connection mode, the at least one home automation device in a connectable state and the MAC-authenticated portable terminal are connected with each other by an input of the connection request button.

4. The home network system of claim 1, wherein each of the at least one home automation device includes a main home automation device directly connected to the wired/wireless Z-Wave bridge, and sub-home automation devices connected to the wired/wireless Z-Wave bridge through the main home automation device, and wherein, as the main home automation device functions as a router, the sub-home automation devices are communicably connected with each other.

5. A home automation device connection method using a home network system including at least one home automation device connected to a Z-Wave network, a main server connecting a portable terminal to the at least one home automation device, and a wired/wireless Z-Wave bridge, the home automation device connection method comprising:

(a) performing, by the main server, an authentication for giving the portable terminal access by using a unique MAC address of the wired/wireless Z-Wave bridge if the portable terminal requests the authentication for connection to the at least one home automation device by using the unique MAC address;

(b) transmitting, by the main server, a remote control signal for the at least one home automation device that is received from an application of the portable terminal that is given access as a result of the authentication, to the wired/wireless Z-Wave bridge, or receiving a notification indicating a state of the at least one home automation device transmitted through the wired/wireless Z-Wave bridge and providing the notification to the portable terminal;

(c) determining, by the main server, whether the authentication is completed by using the unique MAC address of the wired/wireless Z-Wave bridge that is pre-stored when the portable terminal requests the authentication; and (d) switching, by the main server, into a standby state for receiving the unique MAC address of the wired/wireless Z-Wave bridge when the unique MAC address of the wired/wireless Z-Wave bridge that is pre-stored is not present.

6. The home automation device connection method of claim 5, wherein the (a) performing of the authentication includes storing, by the main server, the unique MAC address of the wired/wireless Z-Wave bridge that connection thereto is requested when the unique MAC address is received, to allow the authentication without switching into the standby state when the portable terminal is connected later.

7. The home automation device connection method of claim 5, wherein the (a) performing of the authentication includes:

detecting, by the wired/wireless Z-Wave bridge including a connection button for giving the portable terminal access, an operation of the connection button to be switched into a connection mode, and determining whether the portable terminal requests connection for remotely controlling the at least one home automation device; and detecting, by the main server, an operation of a connection complete button of the wired/wireless Z-Wave bridge when the authentication of the portable terminal is completed to give the portable terminal access to the at least one home automation device.

8. The home automation device connection method of claim 7, wherein the (a) performing of the authentication further includes, detecting, by the at least one home automation device connected to the Z-Wave network including a connection request button for connection, an operation of the connection request button to be switched into a connectable state, and giving the portable terminal access in the connectable state.

* * * * *